(12) United States Patent
McInerny

(10) Patent No.: US 9,740,282 B1
(45) Date of Patent: Aug. 22, 2017

(54) GAZE DIRECTION TRACKING

(71) Applicant: Amazon Technologies, Inc., Seattle, WA (US)

(72) Inventor: Michael James McInerny, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 38 days.

(21) Appl. No.: 14/589,422

(22) Filed: Jan. 5, 2015

(51) Int. Cl.
*G09G 5/00* (2006.01)
*G06F 3/01* (2006.01)
*G02B 27/01* (2006.01)
*G06T 19/00* (2011.01)

(52) U.S. Cl.
CPC ........... *G06F 3/013* (2013.01); *G02B 27/017* (2013.01); *G06T 19/006* (2013.01)

(58) Field of Classification Search
None
See application file for complete search history.

(56) References Cited

U.S. PATENT DOCUMENTS

| | | | | |
|---|---|---|---|---|
| 6,133,944 A | * | 10/2000 | Braun ................... | H04N 5/232 345/31 |
| 2003/0063133 A1 | * | 4/2003 | Foote .................. | G06F 3/04815 715/850 |
| 2008/0309671 A1 | * | 12/2008 | Shuster ................... | G06T 15/20 345/474 |
| 2009/0225001 A1 | * | 9/2009 | Biocca ............... | G02B 27/0172 345/8 |
| 2010/0220897 A1 | * | 9/2010 | Ueno ................. | G06K 9/00208 382/115 |
| 2012/0113209 A1 | * | 5/2012 | Ritchey ................ | H04N 5/2254 348/14.02 |
| 2013/0174213 A1 | * | 7/2013 | Liu ....................... | G02B 27/017 726/1 |
| 2014/0361976 A1 | * | 12/2014 | Osman ............... | G02B 27/0172 345/156 |
| 2014/0362446 A1 | * | 12/2014 | Bickerstaff .......... | G02B 27/017 359/630 |
| 2015/0253573 A1 | * | 9/2015 | Sako .................. | G02B 27/0172 345/156 |
| 2015/0260474 A1 | * | 9/2015 | Rublowsky ............. | F41A 33/00 434/16 |
| 2016/0018655 A1 | * | 1/2016 | Imoto ..................... | G06F 3/011 345/8 |

(Continued)

FOREIGN PATENT DOCUMENTS

JP 2016109760 A * 6/2016

OTHER PUBLICATIONS

Brandon, "500 Hz remote eye tracker watches what you watch," Available at http://www.gizmag.com/smired500500hzremoteeyetracker/16957/, 6 pages (Nov. 16, 2010).

(Continued)

*Primary Examiner* — Kimberly A Williams
(74) *Attorney, Agent, or Firm* — K&L Gates LLP

(57) ABSTRACT

Various examples are directed to systems and methods that measure the gaze direction of a user. For example, gaze direction may be utilized to generate an eye-equivalent representation for the user, where the eye-equivalent representation depicts eyes directed according to the gaze direction.

22 Claims, 16 Drawing Sheets

(56) References Cited

U.S. PATENT DOCUMENTS

2016/0054565 A1* 2/2016 Izumihara ............... G09G 5/00
  345/8

OTHER PUBLICATIONS

Buckley, "Tiny LED makes bionic contact lenses realistic", EE Times Europe, Available at http://www.electronics-eetimes.com/en/tiny-led-makes-bionic-contact-lenses-realistic.html?cmp_id=7&news_id=222923109, 3 pages (Nov. 26, 2014).

Kelion, "Cyborg glasses save users the need to control emotions," BBC News Technology, Available at http://www.bbc.com/news/technology27052773, 2 pages (Apr. 16, 2014).

King, "Google Smart Contact Lens Focuses on Healthcare Billions," Available at http://www.forbes.com/sites/leoking/2014/07/15/google-smart-contact-lens-focuses-on-healthcare-billions, 3 pages (Jul. 15, 2014).

Leclair, "SMI announces eye-tracking upgrade for Oculus Rift," Available at http://www.gizmag.com/eyetrackingoculusrift/34878/, 6 pages (Nov. 21, 2014).

Pikelny, "Robots Roll to Meetins," Columbus CEO, Available at www.columbusceo.com/.../robots-roll-to-meetings-by-phil-pikelny.html, 3 pages (Jan. 2014).

Poole et al., "Eye Tracking in Human-Computer Interaction and Usability Research: Current Status and Future Prospects," In Ghaoui, Claude (Ed.), Encyclopedia of Human Computer Interaction, Idea Group, Available at http://pdf.aminer.org/000/240/997/the_use_of_eye_tracking_for_human_computer_interaction_research.pdf, 13 pages (2006).

* cited by examiner

GAZE DIRECTION TRACKING

BACKGROUND

From gaming to teleconferencing, virtual reality and augmented reality is becoming more common than ever. According to virtual reality, users are provided with visual and sometimes audio feedback simulating a virtual environment. Virtual reality interfaces are used to provide the users with visual and often audio feedback from the virtual environment. According to augmented reality, a virtual reality interface is used to project visual and/or audio features that augment the user's concrete reality. Various types of interfaces are used for virtual and augmented reality, including commercially available virtual reality hoods and optical head-mounted displays.

Users in virtual and augmented reality environments are typically represented to themselves and to other users as avatars. An avatar is a representation of a user. A user's avatar can be a representation of the user's actual physical appearance or can be fanciful. Users interact with one another within virtual reality environments through their avatars. Current avatars, however, do not adequately reproduce the range of human feedback necessary for natural, comfortable interaction.

DETAILED DESCRIPTION

Figure 1:
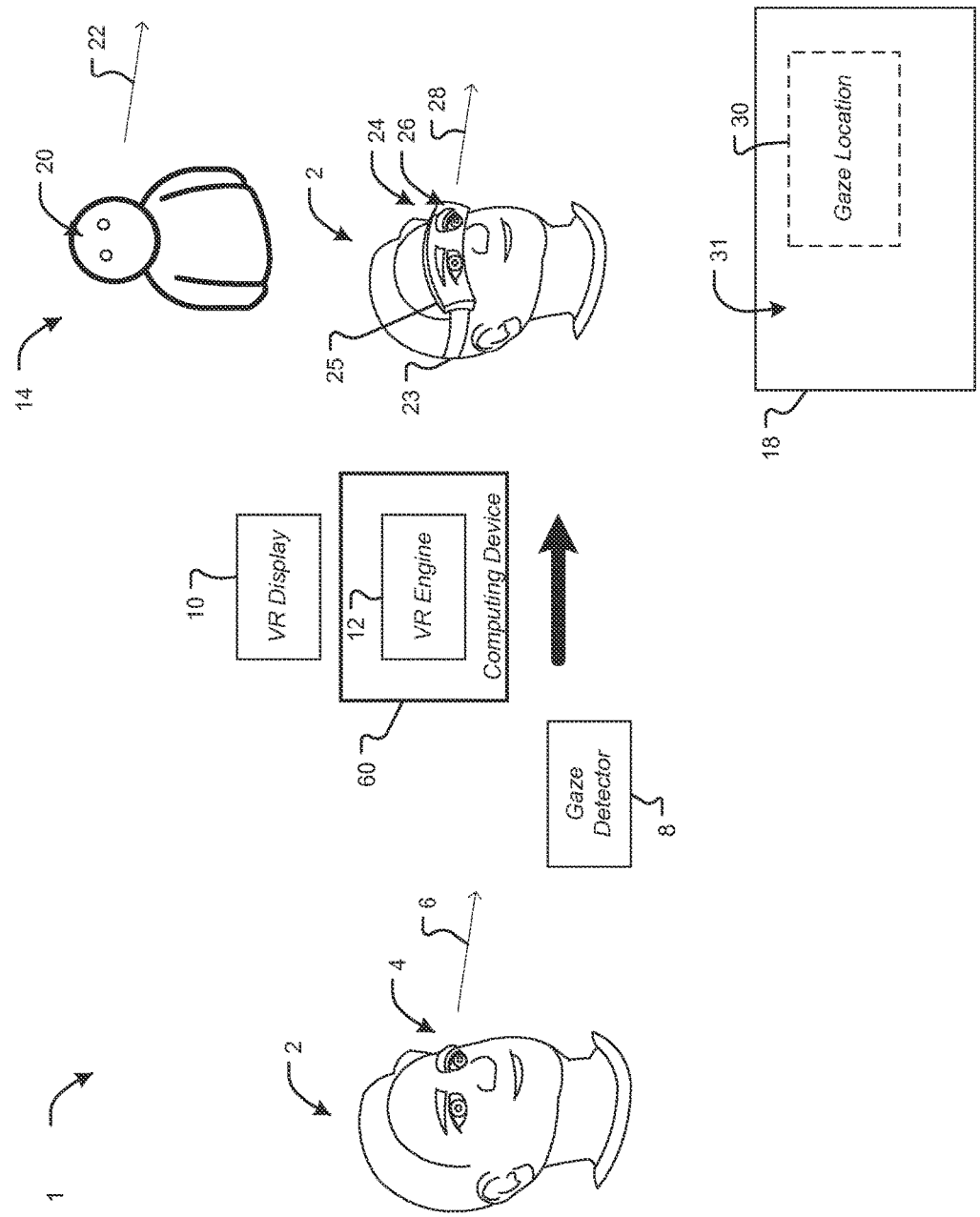
FIG. 1 is a diagram showing an environment that demonstrates several example applications for gaze direction information.

In the following description, reference is made to the accompanying drawings which illustrate several embodiments of the present invention. It is understood that other embodiments may be utilized and various operational changes may be made without departing from the spirit and scope of the present disclosure. The following detailed description is not to be taken in a limiting sense, and the scope of the embodiments of the present invention is defined only by the claims of the issued patent.

The systems and methods described herein are directed to utilizing gaze direction information in virtual reality and augmented reality environments. A gaze detector may be used to capture the gaze direction of a user. The gaze direction may be used in different ways in various different examples. In some examples, the gaze direction may be used to augment a virtual reality (VR) environment. The VR environment may be generated by a computing device and provided to the user via a VR display that may be affixed to the user in a position that at least partially obscures the user's eyes. The user may have an avatar that is present in the VR (e.g., displayed to the user and potentially other users at a particular position). For example, the avatar may be a representation of the user in the VR environment. The computing device may use the gaze direction of the user to generate a corresponding gaze direction of the user's avatar. In this way, the user's avatar may appear to look in the same direction that the user is looking. This may allow other users to determine where a user is looking by viewing the user's avatar.

In another example, gaze direction may be used to communicate the direction in which a user is looking to other people who are not participating in a VR environment. For example, the user may wear a VR display that has outward-directed display. The outward-directed display may be positioned at least partially over the user's eyes and may be viewable to people around the user. The gaze direction may be used to generate an eye-equivalent representation of the user. The eye-equivalent representation may show eyes directed in the gaze direction and may be displayed on the outward-directed display. In this way, people around the user may determine the user's gaze direction even though the user's eyes may be obscured by the VR display.

In yet another example, gaze direction may be used to render a panoramic environment. The gaze direction may be utilized to select a portion of the panoramic environment to be rendered for the user (e.g., rendered for display to the user via the VR display or other suitable display). For example, the user may have a user field-of-view delimiting what is visible to the user. The gaze direction may be used to locate the user field-of-view within the panoramic field-of-view. The rendering of the panoramic field-of-view may be modified based on the position of the user field-of-view. For example, portions of the panoramic field-of-view that fall outside of the user field-of-view may not be rendered at all (e.g., the user may not be able to see these portions anyway). Also, for example, portions of the panoramic field-of-view that correspond to a peripheral area of the user's field-of-view may be rendered at a lower resolution.

FIG. 1 is a diagram showing an environment 1 that demonstrates several example applications for gaze direction information. A user 2 has eyes 4 that the user 2 directs in a gaze direction 6. The gaze direction 6 may be a vector in three-dimensional space where the direction of the vector corresponds to the direction that the user 2 is looking. The magnitude of the vector can indicate an intensity of gaze or, in some examples, may be set equal to unity or one. A gaze detector 8 measures the gaze direction 6 of the user 2, for example, as described herein.

The gaze direction 6, as measured by the gaze detector 8, may be utilized in various different examples. For example, the gaze detector 8 may be in communication with a virtual reality (VR) display 10 and/or a computing device 60 programmed to execute a VR engine 12. The VR engine 12 may generate a VR environment that may be provided to the user 2 via the VR display, as described herein. The VR environment may include an avatar 14. The avatar 14 is a representation of the user 2 in the virtual reality environment. Avatars 14 may be representations of the user's actual physical appearance and/or may be formed to look like other things (e.g., cartoon characters, animals, etc.). The VR engine 12 may be programmed to render eyes 20 of the avatar 14 to have a gaze direction 22 corresponding to the measured gaze direction 6 of the user 2. In this way, other users 2 who encounter the avatar 14 in the VR environment may discern the direction in which the user 2 is looking by looking at the user's avatar 14.

In another example application, gaze direction information may be utilized to provide people outside of a user's VR environment with information about the user's VR environment. For example, the VR display 10 may comprise a VR hood 24 with an outward-directed display 26. The VR hood 24 may comprise a body portion 25 configured to fit over the eyes of the user 2. An inward-directed display (not shown in FIG. 1) may be positioned within the body portion in view of the user 2 so as to provide the user with visual feedback from a VR environment. The inward-directed display may comprise a screen viewable by the user 2 and/or a projector positioned to project an image directly onto the user's eyes. The body portion 25 may be secured to the user 2 by a harness 23 or any other suitable mechanism. The VR engine 12 may be programmed to render eyes on the outward-directed display 26. The eyes may be rendered with a gaze direction 28 corresponding to the measured gaze direction 6 of the user 2. In this way, other people who encounter the user 2 outside of the VR environment may be able to see the user's gaze direction and more easily interact.

In yet another example application, the VR engine 12 may render a representation 18 of a VR environment or other panoramic environment considering the measured gaze direction 6. The representation 18 may be provided to the user 2 utilizing a VR display 10 that may include a VR hood, such as 24. A gaze location 30 may be a portion of the representation 18 at which the user 2 is looking, as indicated by the gaze direction 6. The VR engine 12 may render the gaze location 30 at a first, high resolution that may be, for example, a high-definition or HD resolution. A remainder 31 of the representation 18 may be rendered at a second, lower resolution. This may conserve resources of the VR engine 12. Because the user's vision may not be able to perceive the high resolution beyond the gaze location 30, the user 2 may not recognize the reduced resolution outside of the gaze location 30.

Figure 2:
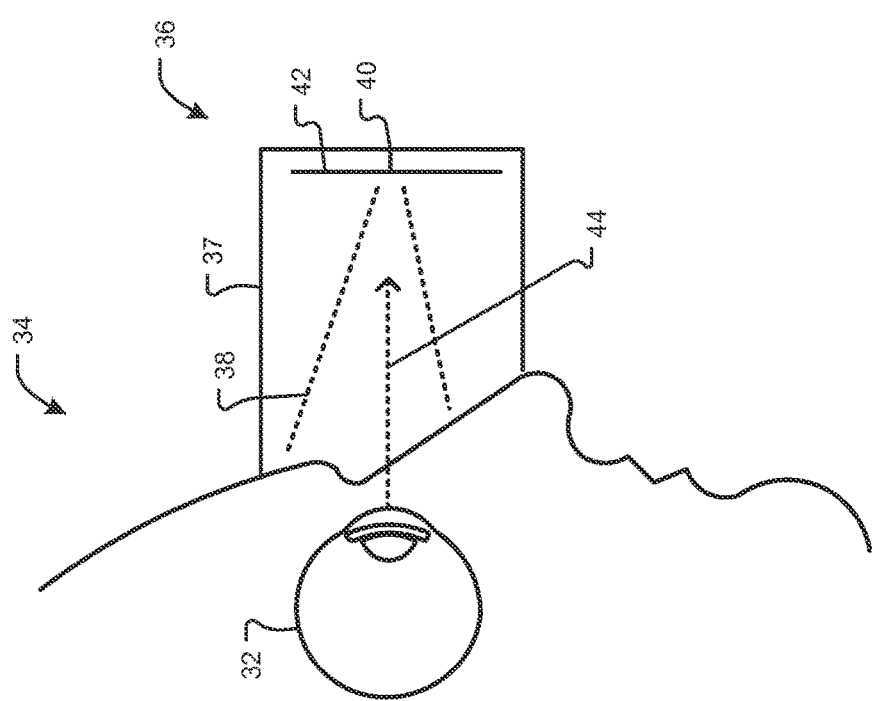
FIG. 2 is a diagram showing one example for implementing a gaze detector in a virtual reality (VR) hood.
Figure 3:
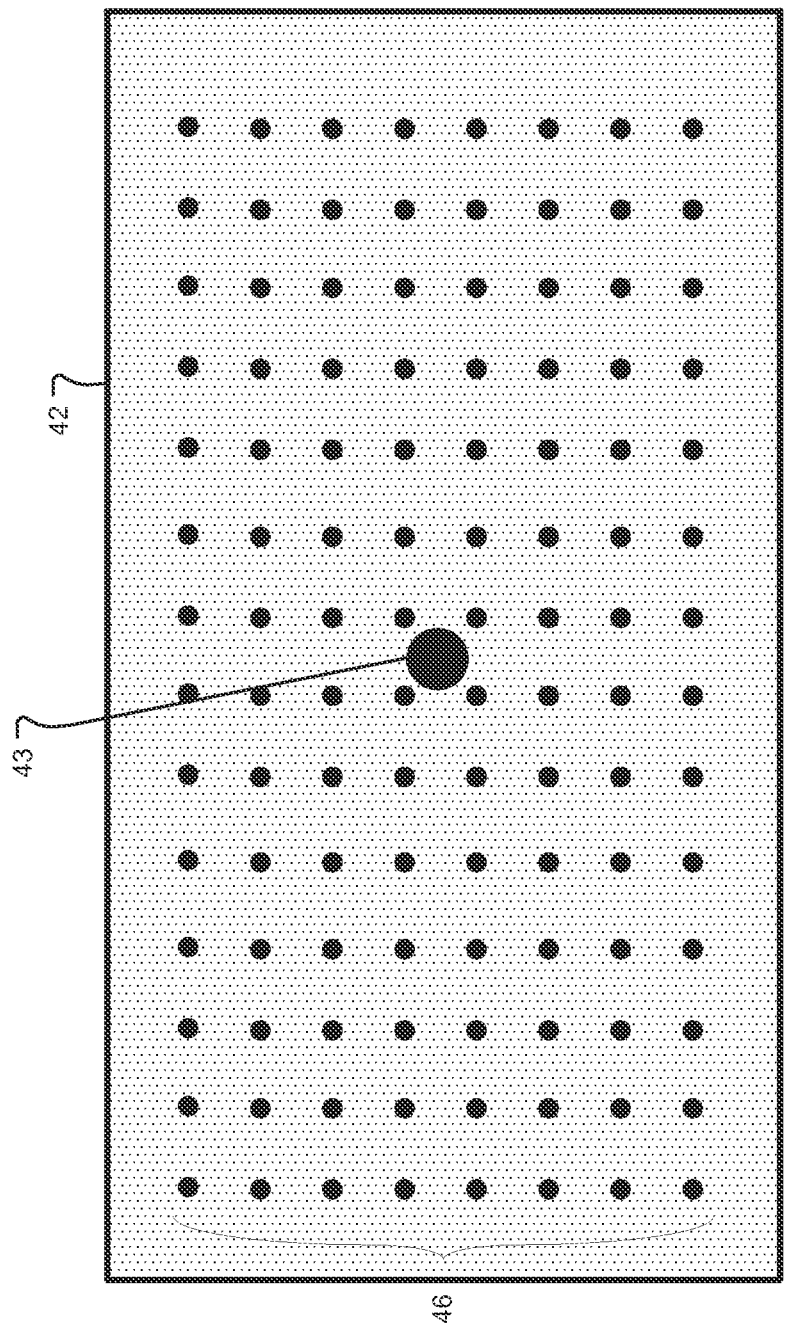
FIG. 3 is a diagram showing one example of a VR hood display.

The gaze detector 8 described above may be implemented according to any suitable method or technology. For example, FIGS. 2 and 3 are diagrams showing one example for implementing a gaze detector in a VR hood 36. The VR hood 36 may comprise a body portion 37 that may be secured over the eyes 32 of the user 34 using any suitable harness, similar to the harness 23 shown in FIG. 1, or other suitable mechanism. In this way, the VR hood 36 may be kept stationary relative to the user's head. The VR hood 36 may comprise an inward-directed display 42 visible to the eyes 32 of the user 34. For example, the display 42 may display the representation 18 described herein above with respect to FIG. 1. In some examples, the VR hood 36 may also comprise a gaze detector. For example, a gaze detector may comprise an infrared (IR) source 40 and one or more IR sensors 46 (FIG. 3). The IR source 40 may be positioned to emit IR energy 38 that illuminates the eyes 32 of the user 34. The IR energy 38 may be reflected from the eyes 32 of the user in a gaze direction 44. Because the human eye, such as 32, is not typically a perfect sphere, the reflection of the IR energy 38 may move as the eye 32 changes its gaze direction.

In some examples, IR sensors 46 are arranged in an array, as shown in FIG. 3. The IR sensors 46 may be distributed across the display 42. The VR hood 36 (and/or supporting computing devices) may be capable of detecting the gaze direction 44 by determining the intensity of reflected IR energy at the array of IR sensors 46. In various examples, reflections may be received from both or the users eyes 32. If the gaze direction of one eye 32 does not match the gaze direction of the other eye 32, then an aggregate gaze direction 44 may be determined, for example, based on an average of the two eyes 32. In addition to, or instead of the IR sensors 46, the VR hood 36 may comprise a camera or other imaging device 43 (FIG. 3). The camera 43 may be sensitive to visible and/or IR energy. Accordingly, images of the user's eyes 32 captured by the camera 43 may be analyzed to determine the direction of the IR reflection from the user's eyes 32. In some examples, described herein, the camera 43 may capture one or more images of the user's eyes 32 that may be used as eye-equivalent images, described herein.

Figure 4:
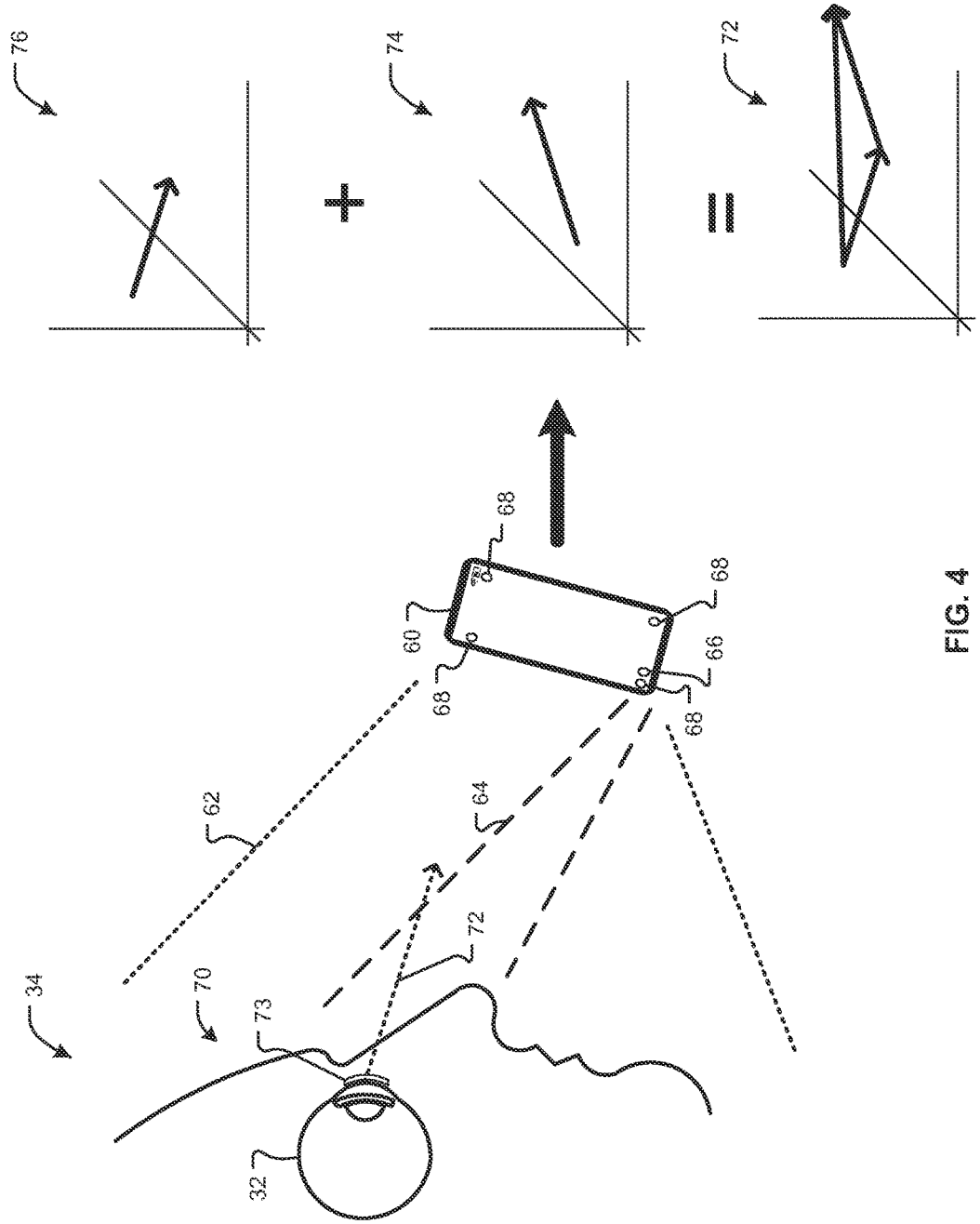
FIG. 4 is a diagram showing another example of a gaze detector implemented utilizing a computing device.
Figure 5A:
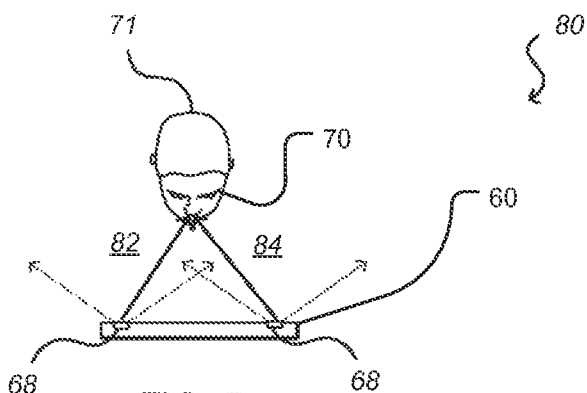
FIGS. 5(a) through 5(e) show an example environment for determining the relative position of a user's face to the computing device.
Figure 5B:
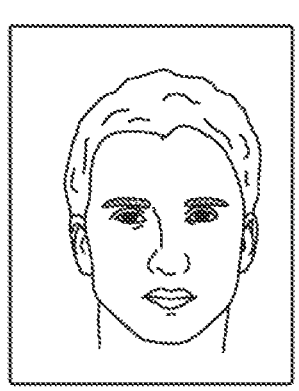
Figure 5C:
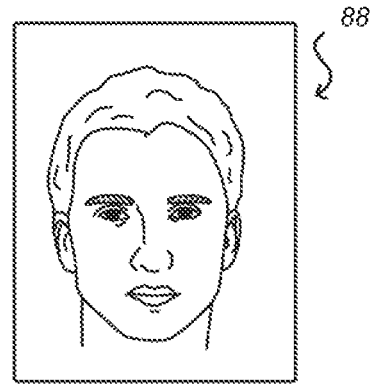
Figure 5D:
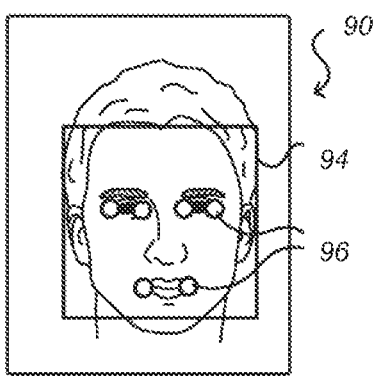
Figure 5E:
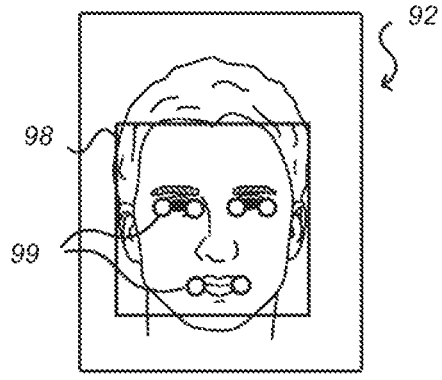

FIG. 4 is a diagram showing another example of a gaze detector 8 implemented utilizing a computing device 60. The computing device 60 may be any suitable type of computing device including, for example, a computing device such as a smart phone, tablet computer, etc., a laptop computer, a desktop computer, etc. The computing device 60 may implement a gaze detector utilizing an IR source 66 and one or more cameras 68. In some examples, the IR source 66 is the screen or display of the device (e.g., display component 106 of FIG. 6). Also, in some examples, the cameras 68 may be sensitive to IR energy and visible light. Because the IR source 66 and cameras 68 are not stationary relative to the user's face 70, the computing device 60 may be programmed to find a gaze direction 72 considering a direction of the user's eyes (eye direction 76) and a direction of the user's face (face direction 74). For example, the computing device 60 may illuminate the eyes 32 of the user 34 with IR energy 64 utilizing the IR source 66. At the same time, the camera or cameras 68 may capture one or more images with a field-of-view 62 including the face 70 of the user 34. The computing device 60 may analyze the image or images to determine a direction of the face 70.

In some examples, the relative direction of a user's face or head can be determined using one or more images captured using a single camera 68. In order to get the direction of the user's face 70 in three dimensions, the computing device 60 may determine a distance from the computing device 60 to the face 70 as well. In some examples, the distance from the computing device 60 to the user's face 70 may be estimated based on feature spacing. For example, the features of the human face may have relatively constant spacing across individuals. The distance between the computing device 60 and the face 70 may be determined by measuring the distance between features of the face 70 (e.g., eyes, nose, mouth, chin, etc.) and finding a ratio of the measured spacing to the expected spacing. Geometric methods may be used to find the distance from the computing device 60 to the face 70.

While an estimate can be made based upon feature spacing viewed from a single camera, for example, it can be desirable in many situations to obtain a more accurate distance from the computing device 60 to the face 70. One way to determine the distance to various features or points is to use stereoscopic imaging, or three-dimensional imaging, although various other distance or depth determining processes can be used as well within the scope of the various embodiments. For any pair of cameras 68 that have at least a partially overlapping field-of-view, three-dimensional imaging can be performed by capturing image information for one or more objects (e.g., the face 70) from two different perspectives or points of view, and combining the information to produce a stereoscopic or "3D" image. In at least some examples, the fields of view can initially be matched through careful placement and calibration, such as by imaging using a known calibration standard and adjusting an optical axis of one or more cameras 68 to have those axes be substantially parallel. The cameras 68 thus can be matched cameras, whereby the fields of view and major axes are aligned, and where the resolution and various other parameters have similar values for each of the cameras 68. Three-dimensional or stereoscopic image information can be captured using two or more cameras to provide three-dimensional point data, or disparity information, which can be used to generate a depth map or otherwise determine the distance from the cameras to various features or objects (e.g., features or objects of the face 70). For a given camera pair, a stereoscopic image of at least one object can be generated using the respective image that was captured by each camera in the pair. Distances measurements for the at least one object then can be determined using each stereoscopic image.

FIGS. 5(*a*) through 5(*e*) show an example environment for determining the relative position of a user's face 70 to the computing device 60. In the environment 80 illustrated in FIG. 5(*a*), a computing device includes a pair of stereo cameras 68 that are capable of capturing stereo image data including a representation of a head 71 and face 70 of a user (or other person within a field-of-view of the cameras). Because the cameras 68 are offset with respect to each other, objects up to a given distance will appear to be at different locations in images captured by each camera. For example, the direction 82 to a point on the user's face 70 from a first camera 68 is different from the direction 84 to that same point from the second camera 68, which will result in a representation of the face being at different locations in images captured by the different cameras. For example, in the image 86 illustrated in FIG. 5(*b*) the features of the user appear to be slightly to the right in the image with respect to the representations of corresponding features of the user in the image 88 illustrated in FIG. 5(*c*). The closer the features are to the cameras, the greater the offset between the representations of those features between the two images. For example, the nose, which is closest to the camera, may have the largest amount of offset, or disparity. The amount of disparity can be used to determine the distance from the cameras 68 as discussed elsewhere herein. Using such an approach to determine the distance to various portions or features of the user's face enables a depth map to be generated which can determine, for each pixel in the image corresponding to the representation of the face 70, the distance to portion of the face 70 represented by that pixel.

Various approaches to identifying a face of a user can be utilized in different embodiments. For example, images can be analyzed to locate elliptical shapes that may correspond to a user's face 70, or image matching can be used to attempt to recognize the face of a particular user by comparing captured image data against one or more existing images of that user. Another approach attempts to identify specific features of a person's head or face, and then use the locations of these features to determine a relative position of the user's head. For example, an example algorithm can analyze the images captured by the left camera 68 and the right camera 68 to attempt to locate specific features 96, 99 of a user's face, as illustrated in the example images 90, 92 of FIGS. 5(*d*) and 5(*e*). The relative location of the features, with respect to each other, in one image should match the relative location of the corresponding features in the other image to within an acceptable amount of deviation. These and/or other features can be used to determine one or more points or regions for head location and tracking purposes, such as a bounding box 94, 98 around the user's face or a point between the user's eyes in each image, which can be designated as the head location, among other such options. The disparity between the bounding boxes and/or designated head location in each image can thus represent the distance to the head as well, such that a location for the head can be determined in three dimensions.

The computing device 60 may utilize a depth map and or feature locations derived as described above to find the direction 74 of the user's face 70 relative to the computing device 60 (e.g., the cameras 68). For example, the computing device 60 may utilize feature spacing. The computing device 60 may utilize geometric methods to find a direction 74 for the user's face 70 from which the features measured as described have a correct spacing relative to one another.

The direction of the face 70 may be an indication of which way the user's face is pointing and may be represented by a face direction 74. The captured image may also comprise reflections of the IR energy 64 from the eyes 32 of the user in the direction of the user's gaze. The position or positions of the reflections in the captured image may be an indication of the direction that the user's eyes 32 are pointed and may be represented by an eye direction 76. The computing device 60 may be programmed to generate a gaze direction 72 from the eye direction 76 and the face direction 74. For example, the vector sum of the eye direction 76 and the face direction vector 74 may indicate the gaze direction 72.

In some examples, the computing device 60 may find the eye direction 76 of the user 34 utilizing an optional contact lens or other optional object 73 positioned on one or both of the users eyes 32. All or a portion of the contact lens may comprise a marker visible to one or more of the cameras 68. For example, the marker may be transparent or semi-transparent to the user 34. The computing device 60 may find the eye direction 76 of the user by tracking a position of the object 73 in an image or images captured by one or more of the cameras 68. In some examples, the object 73 may comprise a gyroscope or similar sensor allowing the object 73 to track movement of the eyes 32. Information describing the movement of the eyes 32 may be communicated to the computing device 60 or other suitable computing device via a wireless communications link. The computing device 60 or other suitable computing device may convert the information describing movement of the eyes 32 into an eye direction 76 in any suitable manner.

In some examples, the intensity of the user's gaze may be measured using any suitable gaze detector, such as those described in FIGS. 2-6. For example, gaze intensity may be determined based on the length of time that the user 34 maintains a particular gaze direction. The longer the user 34 maintains a gaze direction, the more intense the gaze may be considered. Also, for example, gaze intensity may be determined based on a position of the user's eyelids. For example, eyelids that are partially closed around the eye 32 may indicate a more intense gaze while eyelids that are completely open may indicate a less intense gaze. Eyelid position may be determined in any suitable manner. For example, eyelid position may be determined based on an image captured by any suitable camera such as camera 43 (FIG. 3) and/or cameras 68 (FIGS. 4, 5A).

Figure 6:
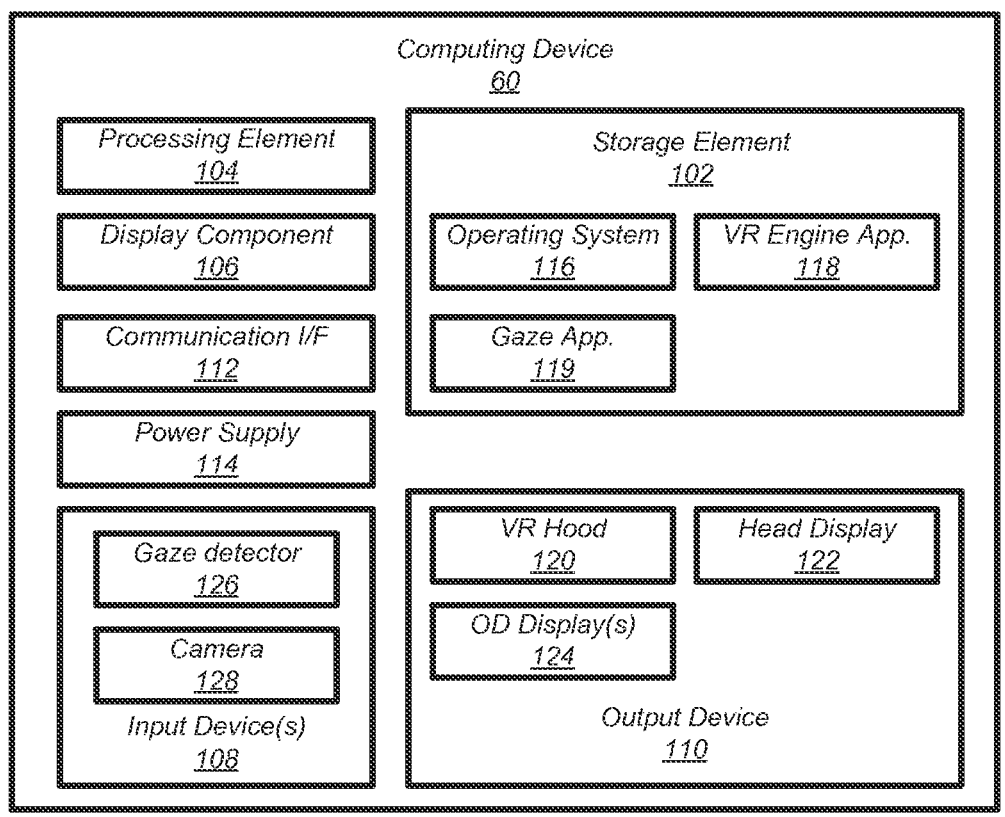
FIG. 6 is a block diagram showing additional details of an example computing device.

FIG. 6 is a block diagram showing additional details of an example computing device 60. The computing device 60 may be used in various contexts described herein. For example, the computing device 60 may implement and/or be in communication with a gaze detector, for example, as described with respect to FIG. 4. Also, in some examples, the computing device 60 may execute a VR engine that generates a VR environment and provides suitable visual and/or audio feedback from the virtual environment. For example, the computing device 60 may render a representation of a VR environment or other panoramic environment, as described herein.

The computing device 60 may include one or more processing elements 104 for executing instructions and retrieving data stored in a storage element 102. The storage element 102 can include one or more different types of memory, data storage or computer readable storage media devoted to different purposes within the computing device 60. For example, the storage element 102 may comprise flash memory, random access memory, disk-based storage, etc. Different portions of the storage element 102, for example, may be used for program instructions for execution by the processing element 104, storage of images or other digital works, and/or a removable storage for transferring data to other devices, etc. The storage element 102 may store software for execution by the processing element 104, such as operating system 116. In some examples, the storage element 102 may also comprise one or more applications. For example, a VR engine application 118 may implement a VR environment and/or render a representation of a VR environment or other panoramic environment, as described herein. A gaze application 119 may detect a user's gaze direction, for example, a described herein.

The computing device 60 may comprise various input and output devices for performing the tasks described herein. For example, a display component 106 may comprise one or more devices such as cathode ray tubes (CRTs), liquid crystal display (LCD) screens, gas plasma-based flat panel displays, LCD projectors, or other types of display devices, etc. Other output devices 110 may include, for example; VR displays such as a VR hood 120 and/or a head-mounted display 122; one or more outward-directed displays 124, etc. The VR hood 120 may be worn, for example, over a user's eyes and/or ears and may provide visual and audio feedback from a VR environment. Example VR hoods are described herein with respect to FIGS. 1-3. A head mounted display 122 may be any suitable display that is worn on a user's head. A head mounted display 122, for example, may project visual feedback either into the user's field-of-view or directly onto the user's eyes. An outward-directed display 124 may be any suitable type of display that is positioned to be visible to third parties (e.g., other than a user of the computing device 60). These output devices 110 may be incorporated into the computing device 60 or may be operably coupled to the computing device 60 via wired or wireless interface.

The computing device 60 may also include one or more input devices 108 operable to receive inputs from a user. The input devices 108 can include, for example, a push button, touch pad, touch screen, wheel, joystick, keyboard, mouse, trackball, keypad, accelerometer, light gun, game controller, or any other such device or element whereby a user can provide inputs to the computing device 60. Additional example input devices 108 include a gaze detector 126 and a camera 128. The gaze detector 126, as described herein, may comprise an IR source and associated IR sensors, although any other type of gaze detector may be used. In some examples, as described herein, the camera 128 may be IR sensitive and may serve as the IR sensor of the gaze detector 126. Input devices 108 may be incorporated into the computing device 60 or operably coupled to the computing device 60 via wired or wireless interface. For computing devices with touch sensitive displays, the input devices 108 can include a touch sensor that operates in conjunction with the display component 106 to permit users to interact with the image displayed by the display component 106 using touch inputs (e.g., with a finger or stylus). The computing device 60 may also include a power supply 114, such as a wired alternating current (AC) converter, a rechargeable battery operable to be recharged through conventional plug-in approaches, or through other approaches such as capacitive charging.

The computing device 60 may also include at least one communication interface 112, comprising one or more wireless components operable to communicate with one or more separate devices within a communication range of the particular wireless protocol. The wireless protocol can be any appropriate protocol used to enable devices to communicate wirelessly, such as Bluetooth, cellular, IEEE 802.11, or infrared communications protocols, such as an IrDA-compliant protocol. For example, the communication interface 112 may be operable to communicate with any of the various output devices 110 described herein.

In various examples, a VR engine may be programmed to transpose a user's gaze direction to the user's avatar in a VR environment, as shown in FIG. 1. The gaze direction of an avatar may be represented in any suitable manner. Gaze direction may also be indicated in any other suitable manner. For example, an arrow or other directed object indicating gaze direction may be rendered on or near the avatar. In some examples, where the avatar has eyes, the eyes may be rendered to point in the gaze direction. In examples where the avatar does not have eyes, eyes pointing in the gaze direction may be rendered and positioned on or near the avatar.

When users share a common VR environment, a first user's gaze direction may be transposed directly to the first user's avatar in the common VR environment without transformation. For example, users may share a common VR environment when those users agree on the presence and position of avatars and other objects in the VR environment. Accordingly, the first user's gaze direction will make sense to other users sharing the common VR environment without transformation.

In various examples, however, users may have overlapping VR environments that are not completely common. For example, some avatars or other objects may be visible to some users (e.g., present in those users' VR environment(s)) but not visible to other users (e.g., not present in those users' VR environment(s)). Also, some avatars or other objects may be at different positions in different user's VR environments. For example, users conducting a teleconference may utilize a document object that is available to some, but not all of the users on the teleconference. Also, for example, a common document object on a teleconference may be positioned at different locations relative to different users, for example, so that the document object appears to all users in a convenient position for reading.

Figure 7:
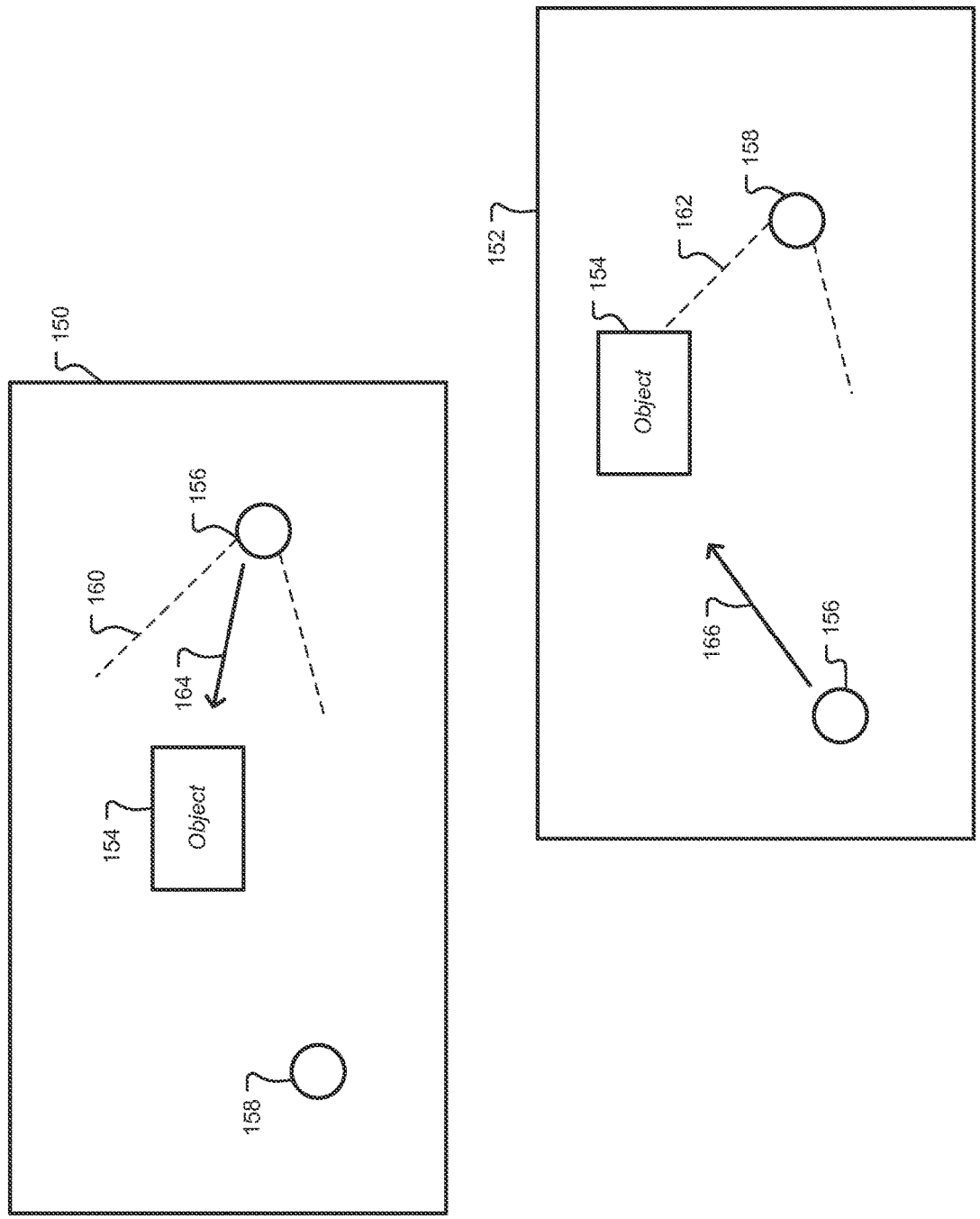
FIG. 7 is chart showing two-dimensional representations of an example pair of overlapping VR environments.

FIG. 7 is chart showing two-dimensional representations of an example pair of overlapping VR environments 150, 152. Although the VR environments 150, 152 are shown in two dimensions, VR environments according to various examples, may comprise additional dimensions. The VR environment 150 may be displayed to a first user represented by an avatar 156. A second user is represented by a second avatar 158. An object 154 is also shown in the VR environment 152. The gaze direction 164 of the first user is indicated with respect to the avatar 156 and is directed towards the object 154. A field-of-view 160 of the avatar 156 indicates a portion of the VR environment 150 that may be provided to the first user, for example, via visual feedback. VR environment 152 may be displayed to the second user, represented by avatar 158. For example, a field-of-view 162 of the avatar 158 may be displayed to the second user. As shown, the VR environment 152 comprises the same objects as the VR environment 150 albeit in different spatial positions. Accordingly, the VR engine may transpose the gaze direction 164 in the first VR environment to a second gaze direction 166. Both gaze directions 164, 166 are directed towards the object 154. In this way, the second user, represented by avatar 158, may view the first avatar 156 as looking at the object 154.

Figure 8:
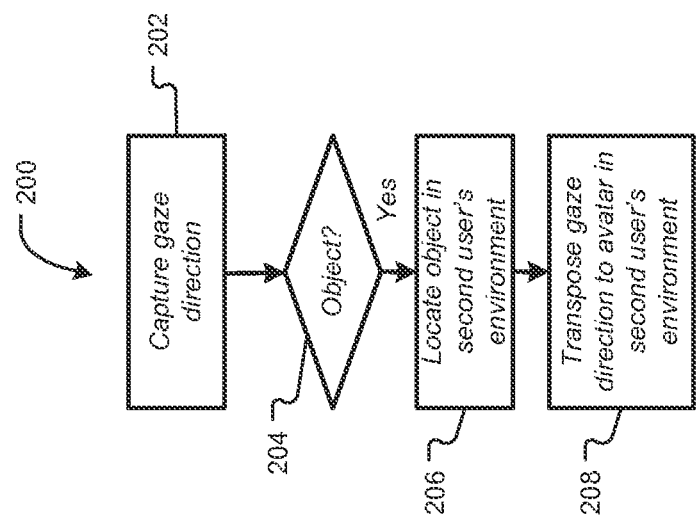
FIG. 8 is a flow chart showing one example of a process flow that may be executed by a VR engine to transpose a user gaze direction to an overlapping VR environment.

FIG. 8 is a flow chart showing one example of a process flow 200 that may be executed by a VR engine to transpose a user gaze direction to an overlapping VR environment, such as described at FIG. 7. At 202, the VR engine may capture a gaze direction of a first user. The gaze direction of the first user may be captured in any suitable manner using any suitable sensors, for example, similar to those described herein with respect to FIGS. 1-4. At 204, the VR engine may determine whether the gaze direction captured at 202 points to an object in the VR environment of the first user. For example, the VR engine may follow a line from the avatar in the gaze direction and determine whether the line intersects any avatars or other objects in the first user's VR environment. If the gaze direction of the first user does not point towards an object, then the VR engine may take any suitable action including, for example, applying the measured gaze direction directly to an avatar of the first user in the second user's VR environment, not applying any gaze direction to the avatar of the first user in the second user's VR environment, etc.

If the captured gaze direction does point towards an object at 204, the VR engine may locate the object in the second user's VR environment. For example, referring to FIG. 7, the gaze of the first user corresponding to avatar 156 points toward the object 154. As illustrated in FIG. 7, the object 154, and the avatar 156, have different positions in the environment 152 than they do in the environment 150. Accordingly, the VR engine may locate the object 154 and the avatar 156 in the second user's VR environment. At 208, the VR engine may transpose the gaze direction to the avatar of the first user in the second user's VR environment. For example, where the first user's avatar has a gaze directed towards an object 154 in the first user's VR environment, the first user's avatar may also have a gaze directed towards the same object 154 in the second user's VR environment, as illustrated in FIG. 7.

Figure 9:
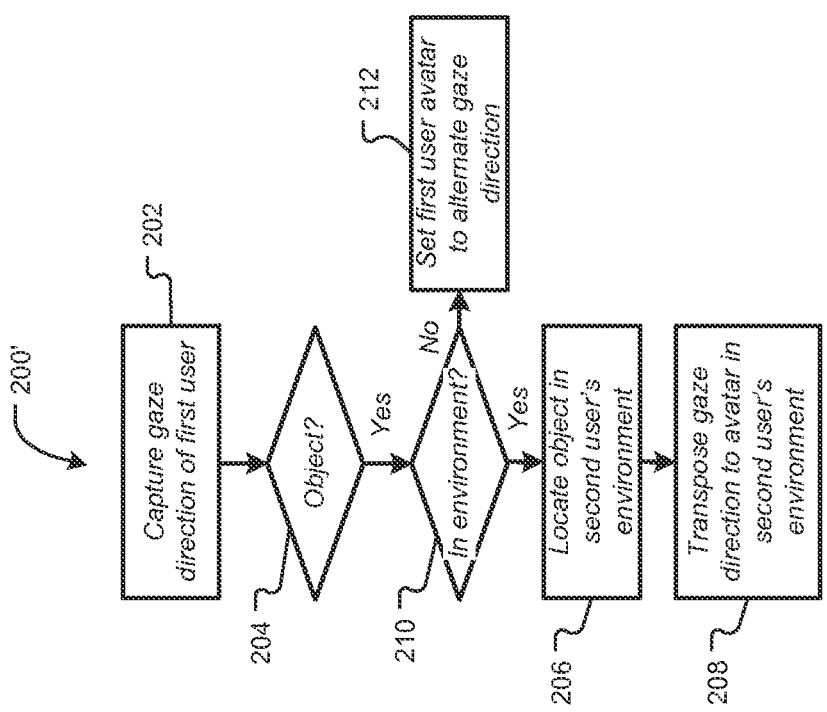
FIG. 9 is a flow chart showing another example of the process flow including additional actions that may be executed when a viewed object is not present in the second overlapping VR environment.

FIG. 9 is a flow chart showing another example of the process flow 200' including additional actions that may be executed when a viewed object is not present in the second overlapping VR environment. At 202, the VR engine may capture a gaze direction of the first user, as described above. At 204, the VR engine may determine whether the gaze direction captured at 202 points to an object in the VR environment of the first user, as described above. If the captured gaze direction does point towards an object at 204, the VR engine may, at 210, determine if the object is present in the second user's VR environment. Determining whether the object is present in the second user's VR environment may include, in some examples, determining whether the second user is authorized to view the object. If the object is present in the second user's VR environment, then the process flow 200' may proceed as described above with respect to FIG. 8. If the object is not present in the second user's VR environment, then the VR engine may, at 212, modify the second user's VR environment to set the first user avatar to an alternate gaze direction. The alternate gaze direction may be any suitable gaze direction including, for example, a direct transposition of the first user's gaze direction, a random gaze direction, no gaze direction, or any other suitable gaze direction. Alternately, in some examples, if the object is not present in the second user's VR environment, the VR engine may render the object in the second user's VR environment and set the gaze direction of the first user's avatar to be directed to the object, where it is rendered in the second user's VR environment. In some examples, the VR engine may verify that the second user (and any other users of the second user's VR environment) is permitted to view the object before rendering the object in the second user's VR environment.

In various examples, user gaze direction may be utilized to provide people outside of the user's VR environment with information about the user's VR environment. For example, the user may be operating in an augmented reality environment where a VR display (e.g., an inward-directed display) provides visual and/or audio feedback that is superimposed on the user's concrete reality. For example, a user may take part in a VR environment that provides the user with enhanced data about real objects in the user's environment (e.g., resumes for people that the user encounters in a professional setting, street and location names for buildings or other geographic points, reviews for restaurants, etc.). When utilizing an augmented reality environment, the user may still desire to interact with other people who are not taking part in the user's VR environment. When the VR display obscures the user's eyes, however, such interaction may be difficult. Accordingly, the user may be fitted with an outward-directed display that provides a representation of the user's eyes with a gaze direction matching the user's own gaze direction.

Figure 10:
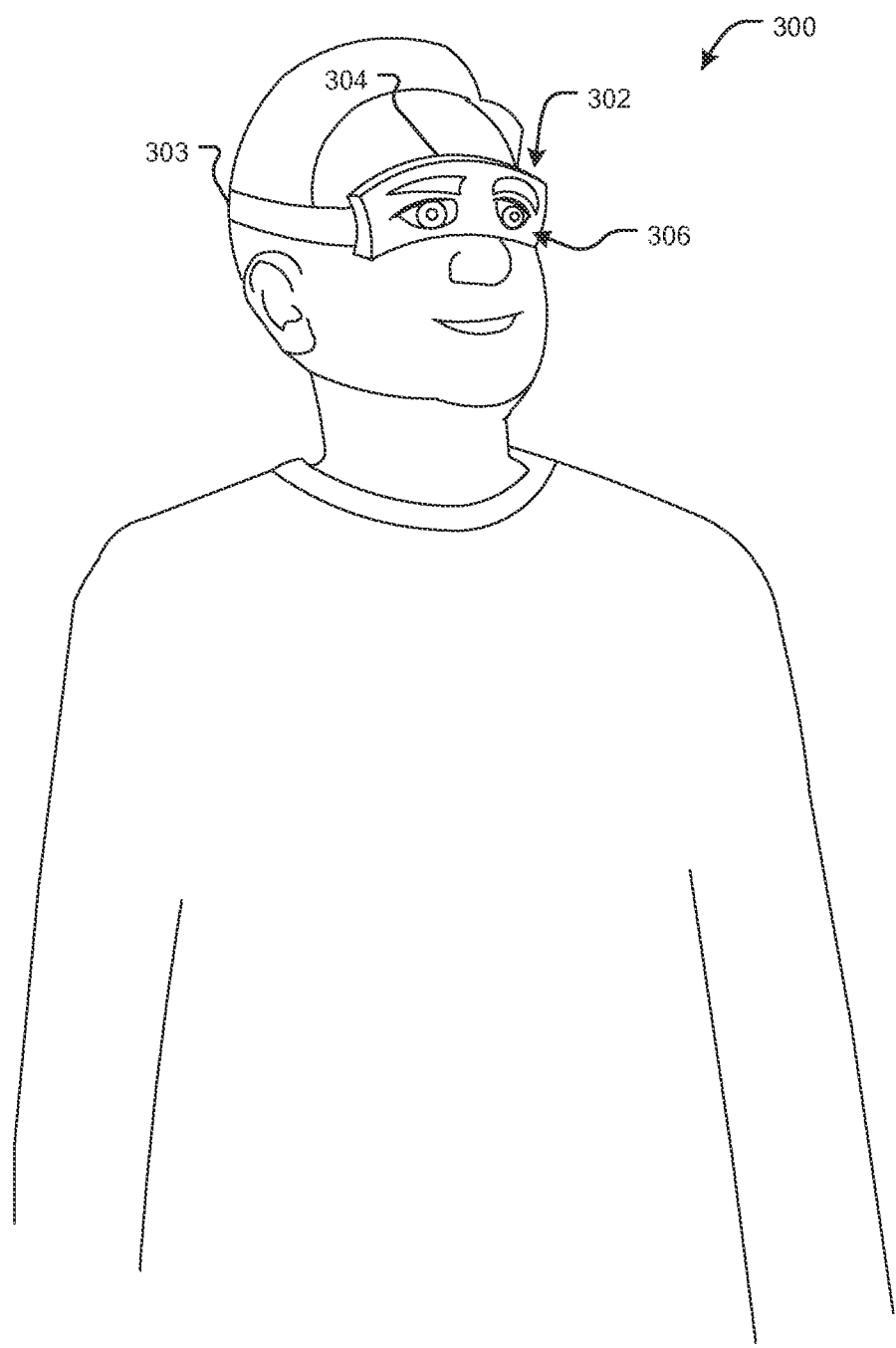
FIG. 10 is a diagram showing one example of a user wearing a VR display.

FIG. 10 is a diagram showing one example of a user 300 wearing a VR display 302. The VR display 302 comprises a body portion 304 that obscures the eyes of the user 300 (eyes not shown in FIG. 10). The body portion 304 may be secured to a head of the user 300 utilizing any suitable harness, such as the harness 303. The VR display 302 may be, for example, a VR hood, a head-mounted display or other suitable display. An inward-directed display similar to the display 42 (FIG. 2) may be provided to give the user 300 visual feedback from a VR environment. The VR display 302 may comprise an outward-directed display 306 programmed by a VR engine to show a representation of eyes (e.g., an eye-equivalent representation). The eye-equivalent representation may be configured to reflect a gaze direction of the user's real eyes. In some examples, the eye-equivalent representation may be an image of the user's eyes, an image of eyes from another human being or animal, an animated or computer-generated representation of eyes, etc.

Figure 11:
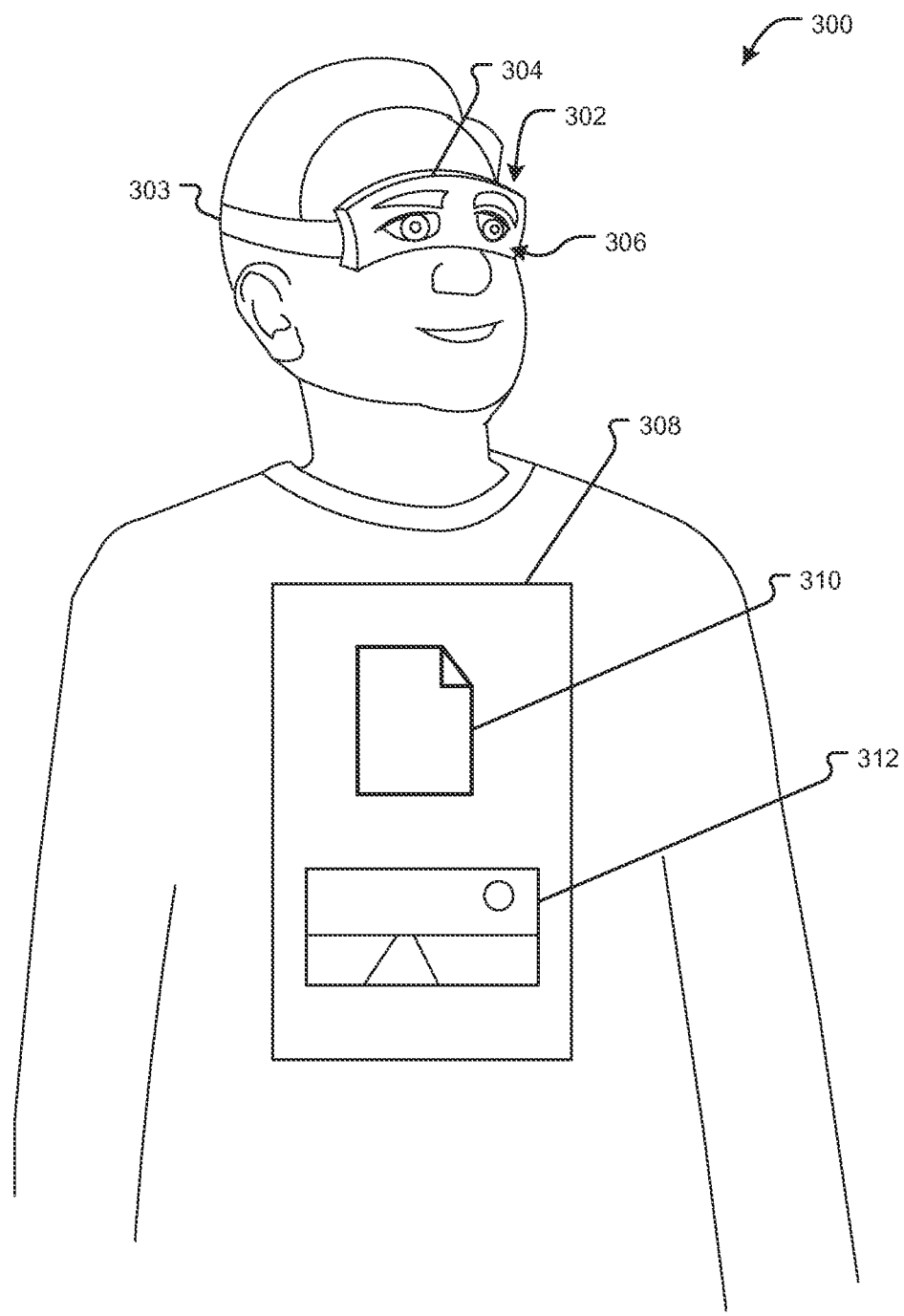
FIG. 11 is a diagram showing another example of the user wearing the VR display and a second outward-directed display.

In some examples, the user 300 may utilize additional outward-directed displays to provide additional information about the user's VR environment to other people or devices. FIG. 11 is a diagram showing another example of the user 300 wearing the VR display 302 and a second outward-directed display 308. The second outward-directed display 308 is shown on the user's chest, but may be worn at any suitable location. The outward-directed display 308 may provide additional information about the user's VR environment by showing an object from the VR environment (e.g., a document 310, a scene 312 or other object). For example, if the user 310 is viewing or utilizing a document 310 in the VR environment, the document 310 may be displayed at the outward-directed display 308. In this way other people or devices not taking part in the user's VR environment may view the document 310 and interact with the user 300 about it. Also, in some examples, if the user 310 is viewing, recalling or otherwise pointing out a scene 312 from the user's VR environment, the scene 312 may be displayed on the outward-directed display 308. In this way other users and devices may view objects from the user's VR environment. In some examples, the user 300 may select documents 310, scenes 312 or other VR environment objects to be displayed on one or both of the outward-directed displays 306, 308.

Figure 12:
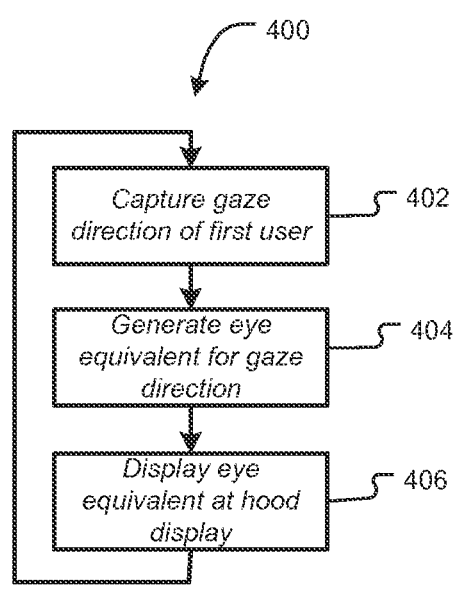
FIG. 12 is a flow chart showing one example of a process flow that may be executed by a VR engine to implement the outward-directed display shown in FIG. 11.

FIG. 12 is a flow chart showing one example of a process flow 400 that may be executed by a VR engine to implement the outward-directed display 304 shown in FIGS. 10 and 11. At 402, the VR engine may capture a gaze direction of the user 300. This may be accomplished in any suitable manner including, for example, as described above with respect to FIGS. 1-4. At 404, the VR engine may generate an eye-equivalent representation for the gaze direction. An eye-equivalent representation may show a pupil positioned in or on an eyeball. The position of the pupil may indicate the gaze direction. The eye-equivalent representation may be generated in any suitable manner. For example, the VR engine may capture images of the user 300 (and specifically the user's eyes) with the user looking over a range of gaze directions. This may be done in real-time. For example, the VR display 302 may comprise a camera, such as camera 43 (FIG. 3) that is positioned to capture an image of the user's eyes. For example, the eye-equivalent for a given gaze direction may be an eye-equivalent image of the user's eyes captured when the gaze direction is measured. In some examples, measuring the gaze direction may be omitted and the VR engine may be configured to capture real-time eye-equivalent images and display the eye-equivalent images on the outward-directed display 304. The VR engine may select the image corresponding to the measured gaze direction, which may be the eye equivalent representation. Also, in some examples, the VR engine may have captured or otherwise received images of the eyes of the user 300 in various different gaze directions. Generating an eye-equivalent representation or image for the gaze direction may comprise selecting a previously captured image having the same or a similar gaze direction. Previously captured images may be images captured of the user 300 and/or of another person or animal. Additionally, in some examples, the VR engine may generate the eye-equivalent utilizing any suitable computer-generated graphics technique. At 406, the VR engine may display the eye equivalent representation at the outward-facing display 304.

In some examples, the VR engine may be configured to generate or select an eye-equivalent representation at 404 that does not match the user's actual gaze direction. For example, the VR engine may be configured to determine if the user 330 has a gaze direction indicating that the user 330 is looking at an object, either a real object or an object in the user's VR environment. If so, the VR engine may select an eye-equivalent representation corresponding to a gaze directed to a real representation of the object. In this way, people who encounter the user 330 may perceive that the user 330 is "actually" gazing at the object. For example, in a conference call, if the user 330 is looking at a conference participant, the eye-equivalent representation may be selected to point at the conference participant.

Figure 13:
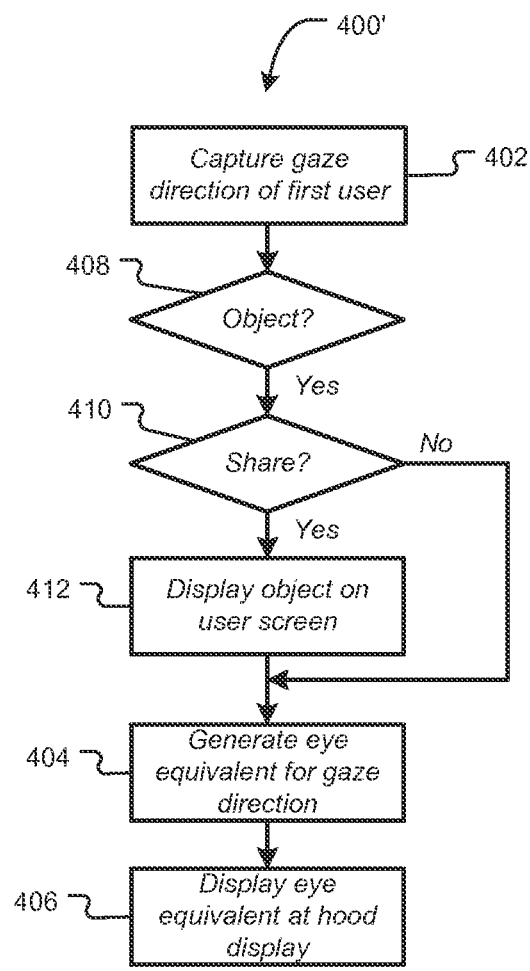
FIG. 13 is a flow chart showing another embodiment of the process flow that may be executed by a VR engine to implement the outward-directed displays and shown in FIG. 11.

FIG. 13 is a flow chart showing another embodiment of the process flow 400' that may be executed by a VR engine to implement the outward-directed displays 304 and 308 shown in FIG. 11. At 402, the VR engine may capture a gaze direction of the user 300. This may be accomplished in any suitable manner including, for example, as described above with respect to FIGS. 1-4. At 408, the VR engine may apply the captured gaze direction to the VR environment of the user to determine if the user 300 is looking at an object in the VR environment, for example, as described herein above. If the user 300 is not looking at an object in the VR environment, the VR engine may proceed to execute 404 and 406 as described above. If the user 300 is looking at an object (e.g., a document 310 or scene 312), then the VR engine may determine at 410 whether the object is sharable. For example, the user 300 may determine which objects or types of objects in the user's VR environment are sharable and which are not. Sharable objects may be objects that can be shared with any people who may come into contact with the user 300 and view the display 308. Non-sharable objects may be object that cannot or should not be shared with any people who may come into contact with the user 300 and view the display 308. If the object is not sharable, the VR engine may proceed to execute 404 and 406 as described above. If the object is sharable, the VR engine may, at 412, display the object at the outward-directed display 308, and then proceed to execute 404 and 406 as described above. In some examples, when an object is displayed on the outward-directed display 308, the VR engine may select the eye-equivalent representation at 404 to be directed at the display 308.

Figure 14:
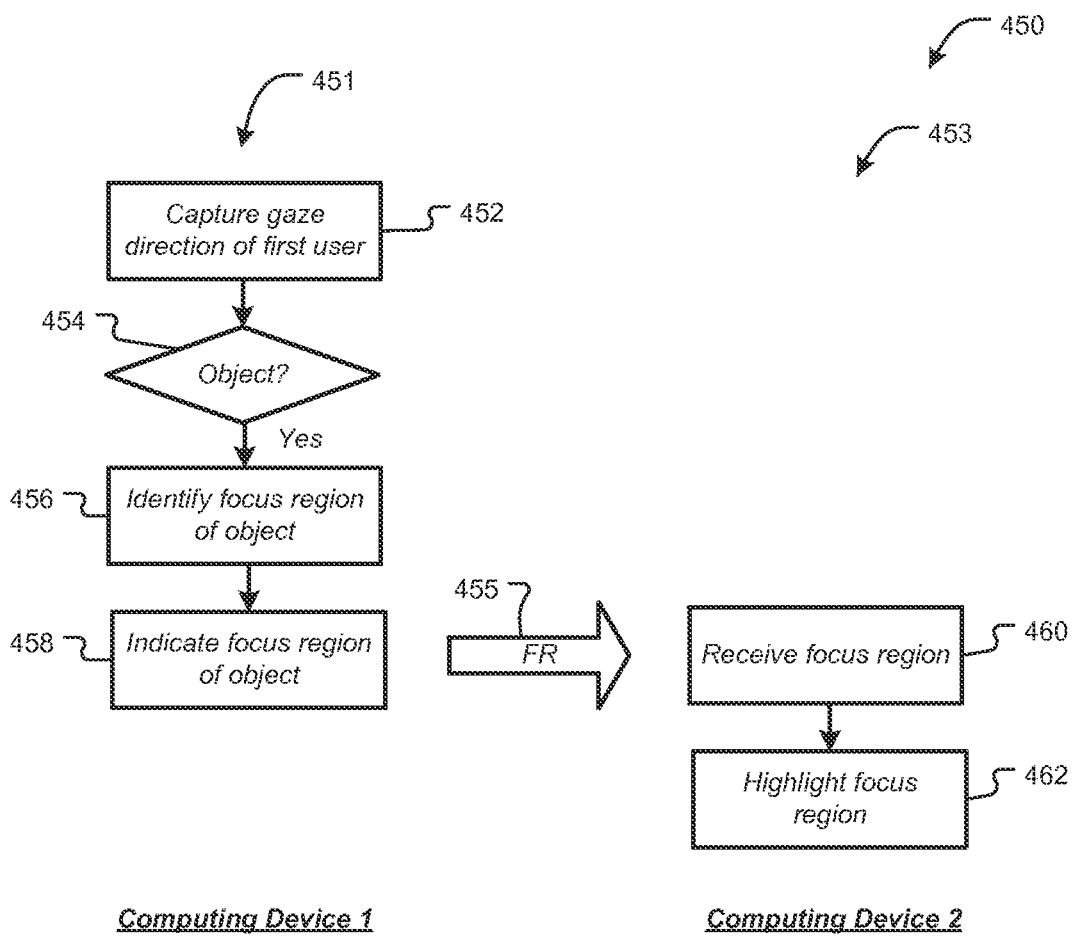
FIG. 14 is a flow chart showing one example of a process flow that may be executed by two or more computing devices to identify and communicate a focus region in a viewed object.

In some examples, gaze direction of a user may be determined to locate a focus region within an image or document and communicate the focus region to other users. FIG. 14 is a flow chart showing one example of a process flow 450 that may be executed by two or more computing devices 60 to identify and communicate a focus region in a viewed object. The process flow 450 comprises two columns 451 and 453. Actions in column 451 may be executed by a first computing device while actions in column 453 may be executed by a second computing device. At 452, the first computing device 50 may capture a gaze direction of a first user. This may be accomplished, for example, as described herein. At 454, the first computing device may determine whether the user's gaze is directed at an object. The object may be a real object and/or an object in a VR environment. Optionally, the first computing device may determine whether the object is sharable, either generally or specifically with the second computing device or a user thereof. If the user's gaze is not directed to an object, the first computing device may continue its processing, for example, by executing any other suitable actions including those described herein. If the user's gaze is directed to an object, the computing device may, at 456, identify a focus region of the object. The focus region of the object may be a region of the object that the user is currently viewing. For example, if the object is a document or image, the focus region may be a point in the document or image that the user is currently focusing on. If the object is a piece of machinery, the focus region may be a region on the object at which the user is currently looking. At 457, the first computing device may communicate the focus region 455 to the second computing device. In some examples, the first computing device may also communicate an indication of the object.

The second computing device may receive the focus region at 460 and may highlight the focus region. For example, the second computing device may provide a display of the object to a user utilizing any suitable type of display or output device, as described herein. The second computing device may highlight the focus region utilizing the display in any suitable manner. For example, the second computing device may simulate a spotlight directed to the focus region; the second computing device may modify the color of the display so that the focus region is colored and other regions of the object have a lower color saturation; the second computing device may modify the clarity of the display so that the focus region is clear and the other regions of the object are obscured; etc. Although only a second computing device is described in FIG. 14, various examples may have the first computing device communicate the focus region 455 to multiple different computing devices. For example, the object may be a document being reviewed on a teleconference and the focus region may be a portion of the document to which the user of the first computing device would like to call attention. It will be appreciated that the process flow 450 may be executed in conjunction with any of the other process flows described herein including, for example, those process flows 200, 200', 400' that involve the identification of an object.

Figure 15:
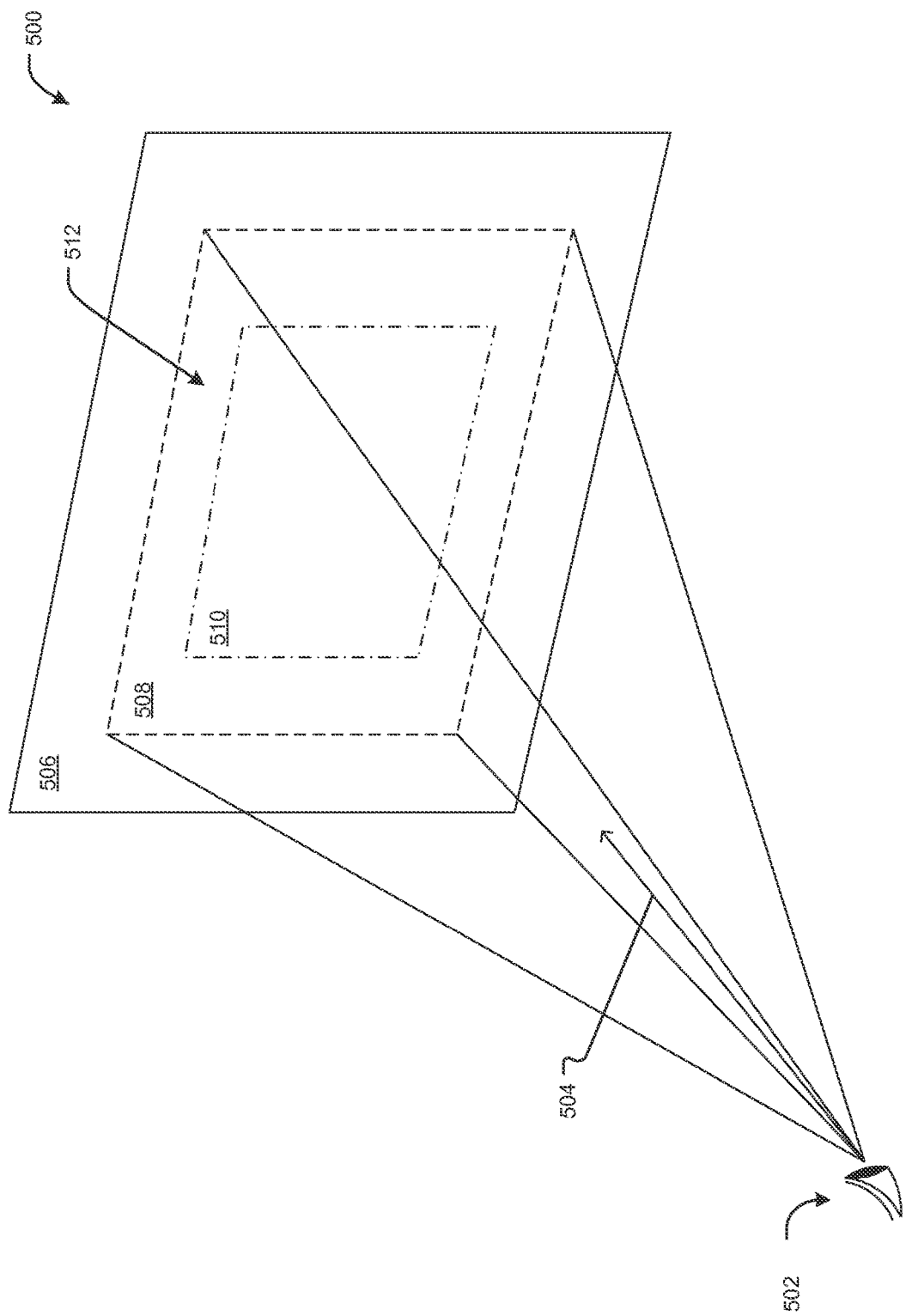
FIG. 15 is a diagram showing one example of a user having a field-of-view projected onto a representation of a panoramic environment.

In various examples, a computing device, such as the computing device 60 or a VR engine thereof, may render a representation of a panoramic environment considering the user's gaze direction. A panoramic environment may be an environment having a field-of-view that is large enough to include a user's focus area as well as all or a part of the user's peripheral area 512. For example, VR environments may be panoramic environments. FIG. 15 is a diagram showing one example of a user 502 having a field-of-view 508 projected onto a representation 506 of a panoramic environment. The representation 506 may have any suitable field-of-view. For example, the representation 506 may be a complete representation of the VR environment. All or part of the representation 506 of the VR environment may be displayed to the user 502 utilizing any suitable VR display.

The user's gaze direction 504 is indicated, along with a user field-of-view 508. The user field-of-view 508 indicates the portion of the representation 508 that is visible to the user 502 at any given time. As the user's gaze direction 504 changes, the user field-of-view 508 may move within the representation 506. The user's field-of-view 508 may be further subdivided to identify a focus area 510. The focus area 510 may be an area of the field-of-view 508 where the user 502 is most sensitive to image resolution. A peripheral area 512 may be a part of the field-of-view 508, but not part of the focus area 510. For example, the peripheral area 512 may correspond to the user's peripheral vision. The sizes of the field-of-view 508, focus area 510, and peripheral area 512 may be determined based on human visual capabilities. For example, these values 508, 510, 512 may be determined specifically by testing particular users or may be determined by aggregating field-of-view data over a large number of people (e.g., by taking an average or median of a plurality of measured values).

In various examples, the computing device 60 may vary the resolution of the representation 506 depending on the user's gaze direction 504. For example portions of the representation 506 outside of the field-of-view 508 may not be rendered at all. The peripheral area 512 may be rendered at a lower resolution, and the focus area 510 may be rendered at a higher resolution. For example, in some examples the peripheral area 512 may be rendered at a lower spatial resolution. Parts or all of the peripheral area may be rendered without color. For example, the peripheral area 512 may correspond to portions of the human field-of-view where most humans cannot perceive color. Although FIG. 15 shows a single focus area 510 and a single peripheral area 512, in some embodiments additional gradations of resolution may be used.

Figure 16:
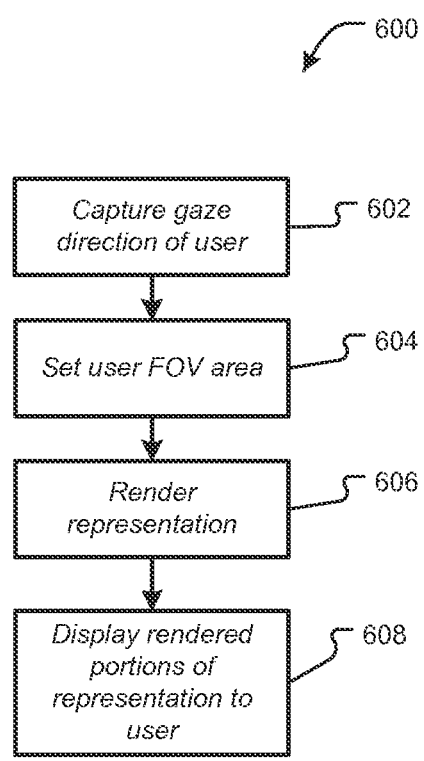
FIG. 16 is a flow chart showing one embodiment of a process flow that may be executed by a computing device to implement the representation of a panoramic environment.

FIG. 16 is a flow chart showing one embodiment of a process flow 600 that may be executed by a computing device 60 to implement the representation 506 of a panoramic environment. At 602, the computing device 60 may capture a gaze direction of the user 502. This may be accomplished in any suitable manner including, for example, as described herein with respect to FIGS. 1-4. At 604, the computing device 60 may set a user field-of-view area based on the measured gaze direction. For example, the computing device 60 may determine the positions within the representation 506 of the focus area 510, the peripheral area 512, and any other gradations of areas within the user field-of-view 508 that may be utilized. At 606, the computing device 60 may render the representation 506 according to the areas determined at 604. For example, the computing device 60 may render the focus area 510 at a highest level of resolution. The peripheral area 512 may be rendered at a lower spatial and/or color resolution. Additional areas, if any, may be rendered at still-lower spatial and/or color resolutions. Some areas (e.g., areas outside of the user's field-of-view 508) may not be rendered at all. At 608, the computing device 60 may display rendered portions of the representation 506 to the user 502, for example, utilizing a suitable VR display as described herein. In some examples, the process flow may be repeated (e.g., in real-time). For example, the computing device 60 may proceed from 608 back to 602 and continue as described. In this way, the rendering of the representation 506 may be continuously updated to adjust to changes in the user's gaze direction 504. In some examples, the computer device 60 may be configured to anticipate changes in the user's gaze direction. For example, the computer device 60 may assume that the user's gaze will continue to move in the same direction. Accordingly, the computer device 60 may pre-render at least a portion of a subsequent frame of the representation 506 based on an anticipated future gaze direction.

Although various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those of ordinary skill in the art and, consequently, are not described in detail herein.

The flowcharts and methods described herein show the functionality and operation of various implementations. If embodied in software, each block or step may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processing component in a computer system. If embodied in hardware, each block may represent a circuit or a number of interconnected circuits to implement the specified logical function(s).

Although the flowcharts and methods described herein may describe a specific order of execution, it is understood that the order of execution may differ from that which is described. For example, the order of execution of two or more blocks or steps may be scrambled relative to the order described. Also, two or more blocks or steps may be executed concurrently or with partial concurrence. Further, in some embodiments, one or more of the blocks or steps may be skipped or omitted. It is understood that all such variations are within the scope of the present disclosure.

Also, any logic or application described herein that comprises software or code can be embodied in any non-transitory computer readable medium for use by or in connection with an instruction execution system such as a processing component in a computer system. In this sense, the logic may comprise, for example, statements including instructions and declarations that can be fetched from the computer readable medium and executed by the instruction execution system. In the context of the present disclosure, a "computer readable medium" can be any medium that can contain, store, or maintain the logic or application described herein for use by or in connection with the instruction execution system. The computer readable medium can comprise any one of many physical media such as magnetic, optical, or semiconductor media. More specific examples of a suitable computer readable media include, but are not limited to, magnetic tapes, magnetic floppy diskettes, magnetic hard drives, memory cards, solid-state drives, USB flash drives, or optical discs. Also, the computer readable medium may be a random access memory (RAM) including, for example, static random access memory (SRAM) and dynamic random access memory (DRAM), or magnetic random access memory (MRAM). In addition, the computer readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

What is claimed is:

1. A computer implemented virtual reality system, the system comprising:
    a body portion;
    a gaze detector positioned to sense a gaze direction of a user, wherein the gaze direction indicates where the user is looking;
    an inward-directed display positioned in the body portion to generate an inward display output directed towards and visible to the user;
    an outward-directed display positioned on the body portion over the eyes of the user to generate an outward display visible to people near the user; and
    a computing device in communication with the inward-directed display, the outward-directed display and the gaze detector, wherein the computing device comprises at least one processor and operatively associated memory, and wherein the computing device is programmed to:
        receive the gaze direction of the user from the gaze detector;
        cause an imaging device to capture an image of the eyes of the user;
        generate an eye-equivalent image for the user, wherein the eye-equivalent image comprises the captured image of the eyes of the user captured by the image capture device and directed according to the gaze direction; and
        display the eye-equivalent image at the outward-directed display.

2. The system of claim 1, wherein generating the eye-equivalent image comprises capturing the image of the eyes of the user at about the time that the gaze direction is sensed by the gaze detector.

3. The system of claim 1, wherein generating the eye-equivalent image comprises selecting a previously captured image of the eyes of the user corresponding to the gaze direction.

4. The system of claim 1, further comprising a second outward-directed display, wherein the computing device is further programmed to:
    identify a first object in a virtual reality environment of the user, wherein the first object is positioned in the virtual reality environment along the gaze direction relative to a position of an avatar of the user in the virtual reality environment;
    determine that the first object is sharable; and
    display a representation of the first object on the second outward-directed display.

5. A computer implemented virtual reality system, the system comprising:
    a body portion;
    a gaze detector positioned to sense a gaze direction of a user;
    an outward-directed display positioned on the body portion at least partially over the eyes of the user to generate an outward display visible to people near the user;
    an inward-directed display positioned in the body portion to generate an inward display output visible to the user; and
    a computing device in communication with the outward-directed display and the gaze detector, wherein the computing device comprises at least one processor and operatively associated memory, and wherein the computing device is programmed to:
  receive the gaze direction of the user from the gaze detector;
  cause an image capture device to capture an image of the eyes of the user;
  generate an eye-equivalent representation for the user, wherein the eye-equivalent representation comprises the captured image of the eyes of the user captured by the image capture device and directed according to the gaze direction; and
  display the eye-equivalent representation at the outward-directed display.

6. The system of claim 5, wherein generating the eye-equivalent representation comprises causing the image capture device to capture the image of the eyes of the user at about the time that the gaze direction is sensed by the gaze detector.

7. The system of claim 5, wherein generating the eye-equivalent representation comprises selecting a previously captured image showing the user's eyes directed in the gaze direction.

8. The system of claim 5, further comprising a second outward-directed display, wherein the computing device is further programmed to:
  identify a first object in a virtual reality environment of the user, wherein the first object is positioned in the virtual reality environment along the gaze direction relative to a position of the user in the virtual reality environment; and
  display a representation of the first object on the second outward-directed display.

9. The system of claim 8, wherein the computing device is further programmed to:
  from the gaze direction, determine a focus area of the first object; and
  transmit the focus area of the first object to at least a second computing device.

10. The system of claim 5, wherein the computing device is further programmed to:
  receive from a second computing device an indication of an object and an indication of a focus region of the object;
  display the object on the inward-directed display; and
  highlight the focus region of the object on the inward-directed display.

11. A computer implemented system, the system comprising:
  a gaze detector positioned to sense a gaze direction of a user, wherein the gaze direction indicates where the user is looking;
  a computing device in communication with the gaze detector, wherein the computing device comprises at least one processor and operatively associated memory, and wherein the computing device is programmed to:
    receive the gaze direction of the user from the gaze detector;
    render an avatar of the user, wherein a gaze direction of the avatar corresponds to the gaze direction of the user;
    identify a first object in a first virtual reality environment based at least in part on the first object being positioned along the gaze direction relative to the avatar of the user; and
    determine a location of the first object in a second virtual reality environment, wherein the location of the first object in the second virtual reality environment is different than a location of the first object in the first virtual reality environment, and wherein rendering the avatar comprises rendering the avatar in the second virtual reality environment, and wherein the gaze direction of the avatar in the second virtual reality environment is directed to the location of the first object in the second virtual reality environment.

12. The system of claim 11, wherein the computing device is further programmed to:
  identify a line beginning at the avatar and directed in the gaze direction; and
  determine that the first object intersects the line.

13. The system of claim 11, wherein the computing device is further programmed to determine that the first object is not present in a second virtual reality environment, wherein rendering the avatar comprises rendering the avatar in the second virtual reality environment, and wherein the gaze direction of the avatar is directed away from other objects in the second virtual reality environment.

14. The system of claim 11, wherein the gaze direction of the avatar is indicated by eyes of the avatar.

15. The system of claim 11, wherein the gaze direction of the avatar is indicated by a directed object pointing in the gaze direction.

16. The system of claim 11, wherein the computing device is programmed to render the avatar of the user in a virtual reality environment.

17. A computer implemented system for generating a representation of a panoramic environment having a panoramic field-of-view, the system comprising:
  a computing device comprising at least one processor and operatively associated memory, wherein the computing device is programmed to:
    receive a first gaze direction of a user;
    determine a first user field-of-view of the user based on the gaze direction, wherein the user field-of-view is at least a first portion of the panoramic field-of-view;
    determine a first focus area of the first user field-of-view;
    determine a first peripheral area of the first user field-of-view outside the first focus area;
    render a first representation of the panoramic environment, wherein rendering the first representation comprises rendering the first focus area at a first resolution and rendering the first peripheral area at a second resolution less than the first resolution;
    receive a second gaze direction of the user;
    determine a second user field-of-view of the user based on the second gaze direction, wherein the second user field-of-view is a second portion of the panoramic field-of-view;
    determine a second focus area of the second user field-of-view;
    determine a second peripheral area of the second field-of-view outside the second focus area; and
    render a second representation of the panoramic environment, wherein rendering the second representation comprises rendering the second focus area at a third resolution and rendering the second peripheral area at a fourth resolution less than the third resolution.

18. The system of claim 17, wherein the first and second resolutions are spatial resolutions.

19. The system of claim 17, wherein rendering the first representation of the panoramic environment comprises:
  rendering the first focus area in color; and
  rendering the first peripheral area without color.

20. The system of claim 17, further comprising a gaze detector positioned to sense the first gaze direction and second gaze direction of the user, and wherein receiving the first gaze direction and second gaze direction of the user comprises receiving the first gaze direction and the second gaze direction of the user from the gaze detector.

21. The system of claim 17, wherein rendering the first representation of the panoramic environment comprises omitting at least a third portion of the panoramic environment outside the first user field-of-view.

22. The system of claim 17, wherein the first representation of the panoramic environment is rendered in a virtual reality environment.

\* \* \* \* \*